(12) United States Patent
Mukai et al.

(10) Patent No.: US 6,260,655 B1
(45) Date of Patent: Jul. 17, 2001

(54) ELECTRIC POWER STEERING APPARATUS

(75) Inventors: Yoshinobu Mukai; Yoshiki Noro, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/131,039

(22) Filed: Aug. 7, 1998

(30) Foreign Application Priority Data

Aug. 25, 1997 (JP) .................................................. 9-228464

(51) Int. Cl.[7] ....................................................... B62D 5/04
(52) U.S. Cl. ............................................................. 180/446
(58) Field of Search .................................. 180/446, 443, 180/400; 701/36, 41, 42

(56) References Cited

U.S. PATENT DOCUMENTS

| | | | |
|---|---|---|---|
| 5,631,833 | * 5/1997 | Wada | 364/424.052 |
| 5,984,042 | * 11/1999 | Nishimoto | 180/446 |
| 5,992,558 | * 11/1999 | Noro | 180/446 |
| 6,008,599 | * 12/1999 | Beck | 318/254 |

* cited by examiner

Primary Examiner—Christopher P. Schwartz
Assistant Examiner—C. T. Bartz
(74) Attorney, Agent, or Firm—Merchant & Gould P.C.

(57) ABSTRACT

An electric power steering apparatus includes a motor condition detector for detecting a stationary, i.e., zero-rotating-speed condition of an electric motor, and a motor resistance calculating section for, when the motor is at the zero rotating speed, executing a division of a voltage supplied to the motor and a current flowing through the motor to thereby calculate a winding resistance value of the motor. Thus, the apparatus can determine an actual winding resistance value of the motor at the zero rotating speed.

5 Claims, 5 Drawing Sheets

ELECTRIC POWER STEERING APPARATUS

BACKGROUND OF THE INVENTION

1. Field of the Invention

The present invention relates to electric power steering apparatuses for automotive vehicles which provide output power of an electric motor to the vehicle steering system to reduce a steering effort to be manually applied by a vehicle driver. More particularly, the invention relates to an electric power steering apparatus which is capable of determining an actual winding resistance value of the electric assisting motor through arithmetic operations.

2. Description of the Related Art

Electric power steering apparatuses are widely used today in automotive vehicles. Improved electric power steering apparatuses have been known, which are arranged to constantly detect a rotating speed of the electric assisting motor and execute so-called "unload control" to decrease a target motor current when the detected rotating speed of the motor is below a predetermined value, (i.e., the motor is in a virtually stationary or nonrotating condition) and a current actually flowing through the motor is over a predetermined value, so as to avoid a waste of the current flowing through the motor.

Whereas a rotating speed sensor, typically in the form of a tacho-generator, is generally used to detect the motor rotating speed ($M_V$), some of the electric power steering apparatuses, rather than using such a sensor, determine the motor rotating speed ($M_V$) from following Equation (1) using a winding resistance value of the motor ($R_M$), current actually flowing through the motor ($I_M$) and voltage supplied to the motor ($V_M$):

$$M_V = V_M - R_M \times I_M \qquad \text{Equation (1)}$$

However, because the winding resistance value $R_M$ applied to Equation (1) is a fixed value as specified in the specifications of the motor, the motor rotating speed $M_V$ often can not be calculated accurately from Equation (1) if an actual winding resistance value $R_M$ of the motor in operation substantially differs from the specified fixed value. Thus, where the motor rotating speed $M_V$ calculated on the basis of the fixed winding resistance value $R_M$ is used for the unload control, the assisting motor would rotate at different speeds than those actually required, with the result that proper unload control is not achieved.

SUMMARY OF THE INVENTION

It is therefore an object of the present invention to provide an electric power steering apparatus which is capable of calculating an actual winding resistance value of an electric assisting motor employed with high accuracy, to thereby permit proper unload control and hence good steering control.

According to a first aspect of the present invention, there is provided an electric power steering apparatus for an automotive vehicle, which comprises: an electric motor for applying an electric steering assist to a steering system interconnecting a steering wheel and steered wheels of the automotive vehicle; a steering torque sensor for detecting steering torque applied to the steering system; a motor voltage detector for detecting a motor voltage supplied to the electric motor; a motor current detector for detecting a motor current flowing through the electric motor; a motor condition detector for detecting a zero-rotating-speed condition of the electric motor; a control unit including a current setting section for setting a target motor current corresponding at least to the steering torque detected by the steering torque sensor, a drive control section for generating a motor control signal on the basis of an offset between the target motor current and the motor current detected by the motor current detector, and a motor resistance calculating section for, on the basis of the motor voltage and motor current, calculating a winding resistance value of the electric motor when the motor condition detector is detecting the zero-rotating-speed condition of the electric motor; and a motor drive for driving the electric motor on the basis of the motor control signal generated by the drive control section.

The control unit further includes a comparator section for making a comparison between a steering angle detected by the steering angle sensor and a reference steering angle corresponding to the zero-rotating-speed condition of the electric motor. When a result of the comparison by the comparator section indicates that the steering angle detected by the steering angle sensor is greater than the reference steering angle, the motor resistance calculating section executes a division of the motor voltage detected by the motor voltage detector by the motor current detected by the motor current detector, to thereby calculate the winding resistance value. When, however, the motor current detected by the motor current detector is below a predetermined value, the motor resistance calculating section does not execute the division.

By the inclusion of the motor condition detector for detecting a zero-rotating-speed condition of the electric motor and the motor resistance calculating section for calculating the winding resistance value of the electric motor on the basis of the motor voltage and motor current, the electric power steering apparatus according to the first aspect can accurately determine an actual winding resistance value of the motor, being employed in the apparatus, when the vehicle steering system is in a rack-end state and the rotating speed of the motor is zero.

According to a second aspect of the present invention, there is provided an electric power steering apparatus for an automotive vehicle, which comprises: an electric motor for applying an electric steering assist to a steering system interconnecting a steering wheel and steered wheels of the automotive vehicle; a steering torque sensor for detecting steering torque applied to the steering system; a motor voltage detector for detecting a motor voltage supplied to the electric motor; a motor current detector for detecting a motor current flowing through the electric motor; a control unit including a current setting section for setting a target motor current corresponding at least to the steering torque detected by the steering torque sensor, a drive control section for generating a motor control signal on the basis of an offset between the target motor current and the motor current detected by the motor current detector, a comparator section for making a comparison between the motor current detected by the motor current detector and a maximum target motor current set by the current setting section, and a motor resistance calculating section for calculating a winding resistance value of the electric motor when the motor current detected by the motor current detector has become greater the maximum target motor current; and a motor drive for driving the electric motor on the basis of the motor control signal generated by the drive control section.

By the inclusion of the comparator section for making a comparison between the motor current detected by the motor current detector and a maximum target motor current set by the current setting section and the motor resistance calculating section for calculating a winding resistance value of the electric motor when the motor current detected by the motor current detector has become greater the maximum target motor current, the electric power steering apparatus according to the second aspect can determine the actual winding resistance value of the electric assisting motor being employed in the apparatus, by detecting a point when the motor current has exceeded the maximum target motor current value and treating the detected point as a zero-rotating-speed condition of the assisting motor. This arrangement can eliminate a need for the above-mentioned motor condition detector.

BRIEF DESCRIPTION OF THE DRAWINGS

The above and other objects and advantages of the present invention will become apparent from the following detailed description of the preferred embodiments when read in conjunction with the accompanying drawings, in which.

DETAILED DESCRIPTION OF THE PREFERRED EMBODIMENTS

Figure 1:
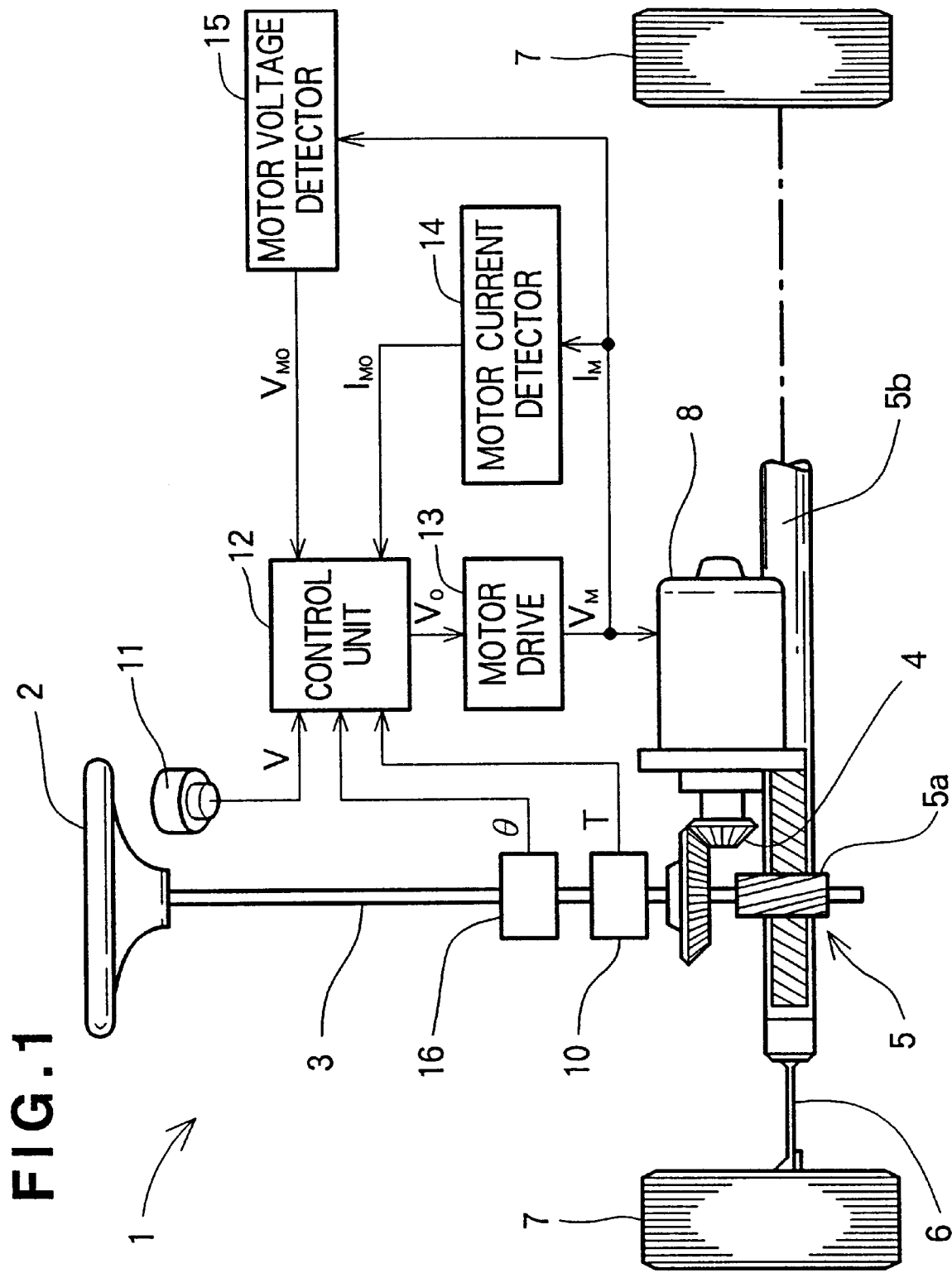
FIG. 1 is a diagram showing a general setup of an electric power steering apparatus according to a first embodiment of the present invention.

Reference is initially made to FIG. 1 showing, in block diagram, a general structure of an electric power steering apparatus 1 according to a first embodiment of the present invention, which is arranged to detect a rack-end state of the vehicle steering system and determine an actual winding resistance value of an electric assisting motor when the rotating speed of the motor is zero. Mechanically, the electric power steering apparatus 1 comprises a steering wheel 2, a steering shaft 3, a hypoid gear 4, a rack-and-pinion steering gear mechanism 5 including a pinion 5a and a rack shaft 5b, left and right steered front wheels 7 connected to opposite ends of the rack shaft 5b via tie rods 6, and an electric motor 8 for generating an electric steering assist.

As electric components, the electric power steering apparatus 1 comprises a steering torque sensor 10, a vehicle velocity sensor 11, a control unit 12, a motor drive 13, a motor current detector 14 and a motor voltage detector 15. The steering torque sensor 10 detects manual steering torque acting on the steering wheel 2 and outputs a steering torque signal T that is an electric signal corresponding to the detected steering torque. The vehicle velocity sensor 11 detects a velocity of the automotive vehicle and outputs a vehicle velocity signal V that is an electric signal corresponding to the detected vehicle velocity. The control unit 12 sets a target motor current $I_M$ for driving the electric assisting motor 8 on the basis of the steering torque signal T and vehicle velocity signal V and also generates a motor control signal $V_O$ corresponding to the target motor current $I_M$. The motor drive 13 drives the electric motor 8 with a motor voltage $V_M$ based on the motor control signal $V_O$, using the known PWM (Pulse Width Modulation) control technique. The motor current detector 14 detects a motor current $I_M$ actually flowing through the electric motor 8 and corresponding to forward or reverse rotary motion of the motor 8 and outputs a motor current signal $I_{MO}$ representative of the detected motor current $I_M$. The motor voltage detector 15 detects the motor voltage $V_M$ supplied to the electric assisting motor 8 and outputs a motor voltage signal $V_{MO}$, representative of the detected motor voltage $V_M$, to the control unit 12.

The electric power steering apparatus 1 further includes a steering angle sensor 16 that detects a steering angle corresponding to a rotational angle of the steering wheel 2 and outputs a steering angle signal θ representative of the detected steering angle. This steering angle sensor 16 constitutes a detector for detecting a predetermined motor condition where the assisting motor 8 is placed in a stationary or nonrotating condition by the steering wheel 2 being turned to its full extent to cause the rack shaft 5b to abut against a rack end. In this embodiment, a particular steering angle when the steering wheel 2 is turned from its center position to the extent that the rack shaft 5b abuts against the rack end is preset as a reference steering angle $θ_K$.

As the vehicle driver turns the steering wheel 2, the steering torque sensor 10 and steering angle sensor 16 mounted on the steering shaft 3 detect steering torque and angle, respectively, to feed steering torque and angle signals T and θ to the control unit 12. The steering torque manually applied by the vehicle driver to the steering shaft 3 is converted, via the rack-and-pinion steering gear mechanism 5, into an axial linear movement of the rack shaft 5b, which changes the direction of the front wheels 7 by way of the tie rods 6.

Figure 2:
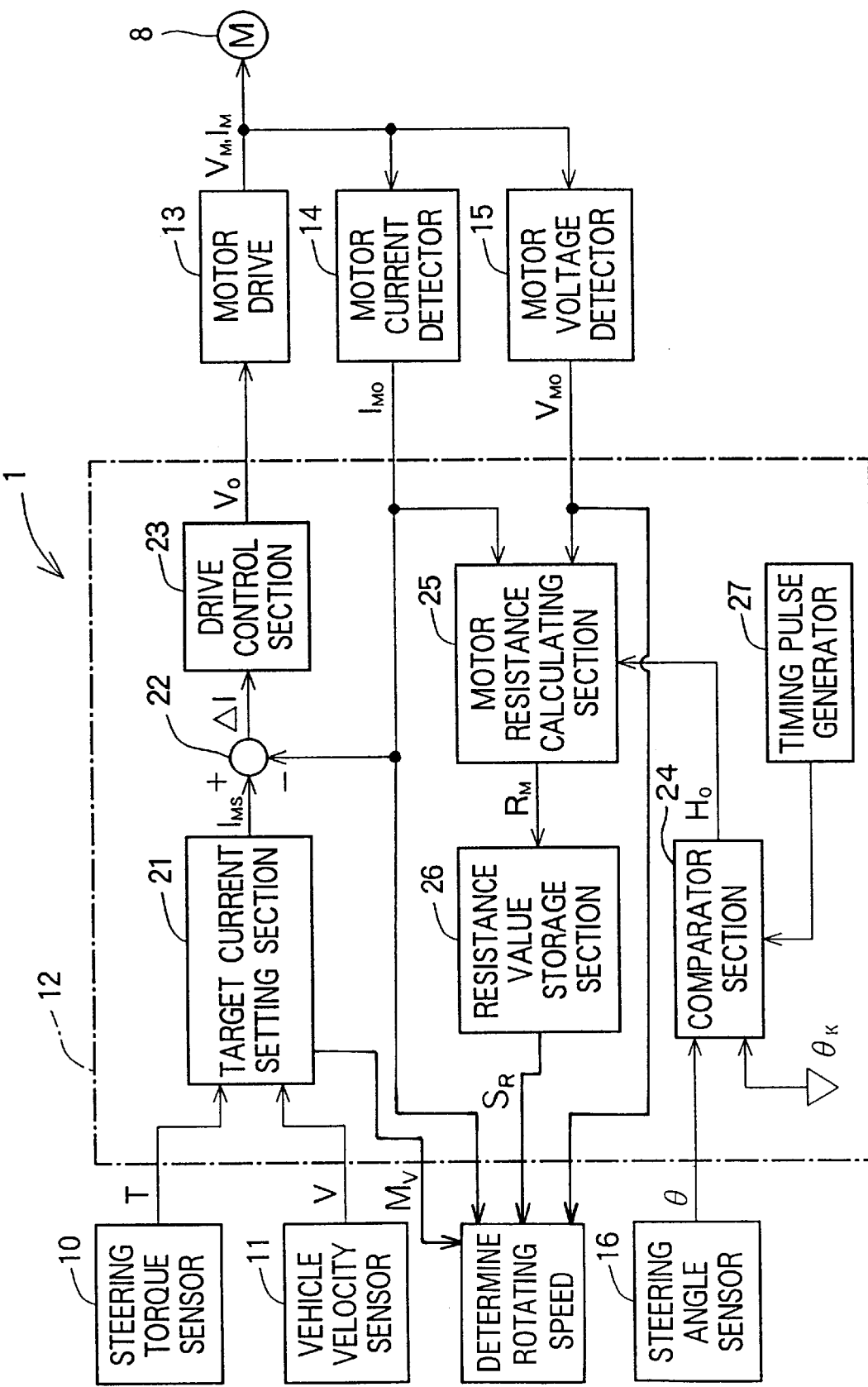
FIG. 2 is a block diagram showing principal electrical components of the electric power steering apparatus of FIG. 1.

FIG. 2 is a block diagram showing principal components of the electric power steering apparatus of FIG. 1. The control unit 12, which basically comprises a microprocessor, an arithmetic operation section, a processing section and a memory, generates a target motor current signal corresponding at least to the steering torque signal T and then generates a motor control signal $V_O$ corresponding to the target motor current signal. The control unit 12 passes the thus-generated motor control signal $V_O$ to the motor drive 13, which in turn drives the electric assisting motor 8 with a motor voltage $V_M$ on the basis of the known PWM control technique. Further, the control unit 12 calculates a winding resistance $R_M$ of the assisting motor 8 on the basis of the motor voltage signal $V_{MO}$ from the motor voltage detector 15 and the motor current signal $I_{MO}$ from the motor current detector 14 in response to the steering angle signal θ from the steering angle sensor 16 representing the nonrotating condition of the motor 8.

The motor drive 13 includes a plurality of (e.g., four) switching elements, such as power FETs (Field Effect Transistors) or IGBTs (Insulated-Gate Bipolar Transistors), and generates the motor voltage $V_M$ corresponding to the motor control signal $V_O$ (PWM control signal) so that the motor 8 is driven by a bidirectional motor current $I_M$ corresponding to the absolute value and direction of the steering torque T.

Output power or torque generated by the electric motor 8 is increased twofold via the hypoid gear 4 and applied to the steering shaft 3 as an electric steering assist torque. The motor current detector 14 converts the motor current $I_M$, to be actually passed to the motor 8, into voltage by means of resistance and/or Hall effect device, and the converted voltage is then again converted into a corresponding motor current signal $I_{MO}$. The motor current signal $I_{MO}$ is sent to the control unit 12 for negative feedback to the target motor current. The motor voltage detector 15 detects a motor voltage $V_M$ to feed a motor voltage signal $V_{MO}$ to the control unit 12.

More specifically, the control unit 12 further includes a target motor current setting section 21, an offset calculating section 22, a drive control section 23, a comparator section 24, a motor resistance calculating section 25 and a resistance value storage section 26.

The target motor current setting section 21 includes a memory, such as a ROM, which has prestored therein various values of target motor current $I_M$, acquired through experiments, arithmetic operations or the like, corresponding to possible values of steering torque signal T. Upon receipt of a steering torque signal T from the steering torque sensor 10, the target motor current setting section 21 reads out one of the values of target motor current $I_M$ corresponding to the value of the received steering torque signal T and passes the read-out value of target motor current $I_M$ to the offset calculating section 22.

The offset calculating section 22 computes a difference or offset between the values of the target motor current signal $I_{MS}$ from the target motor current setting section 21 and the motor current signal $I_{MO}$ from the motor current detector 14 and then supplies the drive control section 23 with an offset signal $\Delta I$ indicative of the computed offset. The drive control section 23, which includes a PID control and a control signal generator, performs PID (Proportional, Integral and Differential) operations on the offset signal $\Delta I$ from the offset calculating section 22, generates a motor control signal $V_O$ comprised of an ON signal and PWM control signal having a predetermined duty cycle, and feeds the motor control signal $V_O$ to the motor drive 13.

Each time a timing pulse is received from a timing pulse generator 27, the comparator section 24 makes a comparison between the steering angle signal θ supplied from the steering angle sensor 16 constituting the motor condition detector and the preset reference steering angle $θ_K$ corresponding to the nonrotating condition of the motor 8 with the rack shaft 5b abutting against the rack end. If the steering angle signal θ from the steering angle sensor 16 is equal to or greater in value than the reference steering angle $θ_K$ ($θ ≧ θ_K$), the comparator section 24 outputs a first-level (e.g., high-level) comparison result signal to the motor resistance calculating section 25, but if the steering angle signal θ from the steering angle sensor 16 is smaller in value than the reference steering angle $θ_K$ ($θ < θ_K$), the comparator section 24 outputs a second-level (e.g., low-level) comparison result signal to the motor resistance calculating section 25.

Figure 5:
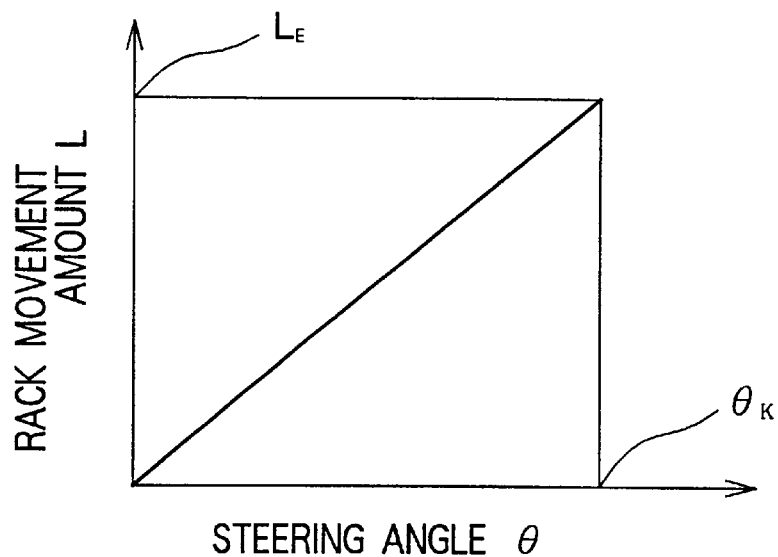
FIG. 5 is a graph showing an exemplary characteristic curve of rack movement amount versus steering angle in the first embodiment.

FIG. 5 is a graph showing an exemplary characteristic curve of rack movement amount (amount of movement of the rack shaft 5b) versus steering angle θ in the first embodiment. As seen in FIG. 5, the rack movement amount L increases as the steering angle θ becomes greater. When the steering angle θ reaches the reference steering angle $θ_K$, the rack movement amount L reaches a rack end amount $L_E$ and the rack shaft 5b is made no longer movable by a mechanical stopper. Thus, by constantly detecting the steering angle θ, it is possible to detect a zero-rotating-speed, i.e., stationary condition of the assisting motor 8.

Upon receipt of the high-level comparison result signal $H_O$ from the comparator 24, the motor resistance calculating section 25, which has a division function, divides the value of the motor voltage signal $V_{MO}$ supplied from the motor voltage detector 15 by the value of the motor current signal $I_{MO}$ supplied from the motor current detector 14 to thereby determine a winding resistance value $R_M$ of the assisting motor 8 ($R_M = V_{MO}/I_{MO}$). The thus-determined resistance value $R_M$ will be stored into the resistance value storage section 26. Note that the above-mentioned division is not executed when the value of the motor current signal $I_{MO}$ is below a predetermined value, because the winding resistance value $R_M$ would not be determined with sufficient accuracy under such a condition. The winding resistance value $R_M$ of the motor 8 may be computed from Equation (1) above by treating the motor rotating speed $M_V$ as zero ($M_V = 0$) as follows:

$$R_M = V_M / I_M \qquad (2)$$

The resistance value storage section 26 comprises a rewritable memory, such as an EEPROM, which retains the winding resistance value $R_M$ until a new winding resistance value $R_M$ is received from the motor resistance calculating section 25 and outputs the stored value $R_M$ as a winding resistance value signal $S_R$ when necessary.

Because the stored content in the resistance value storage section 26 represents an actual winding resistance value $R_M$, rather than a fixed value specified in the specifications, of the electric assisting motor 8 being employed in the apparatus as indicated at numeral 28, the motor rotating speed $M_V$ can be determined with high accuracy on the basis of the motor current $I_M$ and motor voltage $V_M$ in any steering conditions, by just applying the stored actual winding resistance value $R_M$ to Equation (1) above. The motor rotating speed $M_V$ thus determined with high accuracy can be used to permit proper the "unload control" and hence good steering control. In a preferred implementation, the determination of the winding resistance value $R_M$ is carried out prior to shipment of the automotive vehicle from a factory or during maintenance or inspection at a service station, by purposely creating a rack-end state. The actual winding resistance value $R_M$ may also be determined by the vehicle driver effecting a steering operation without driving.

The first embodiment has been described above as detecting a nonrotating or stationary condition of the assisting motor 8 by detecting a rack-end state. Alternatively, a differentiator may be additionally provided to perform differential operations on the signal generated by the steering angle sensor 16 so that the motor 8 can be determined as being in the stationary condition when the differentiated signal value is zero ($dθ/dt = 0$). Further, whereas the first embodiment has been described above as using the steering angle sensor as the motor condition detector for detecting the zero-rotating-speed condition, any other sensors, such as a limit switch or position sensor capable of detecting a rack end, may be used as the motor condition detector.

In summary, the electric power steering apparatus according to the first embodiment is characterized in that it includes the motor condition detector 16 for detecting when the assisting motor 8 is in the zero-rotating-speed condition and the motor resistance calculating section 25 for computing a winding resistance value $R_M$ of the motor 8 on the basis of a motor current $I_M$ and motor voltage $V_M$. With this arrangement, the electric power steering apparatus can accurately determine an actual winding resistance value $R_M$ of the motor 8, being employed in the apparatus, when the vehicle steering system is in a rack-end state and the rotating speed of the motor 8 is zero.

Figure 3:
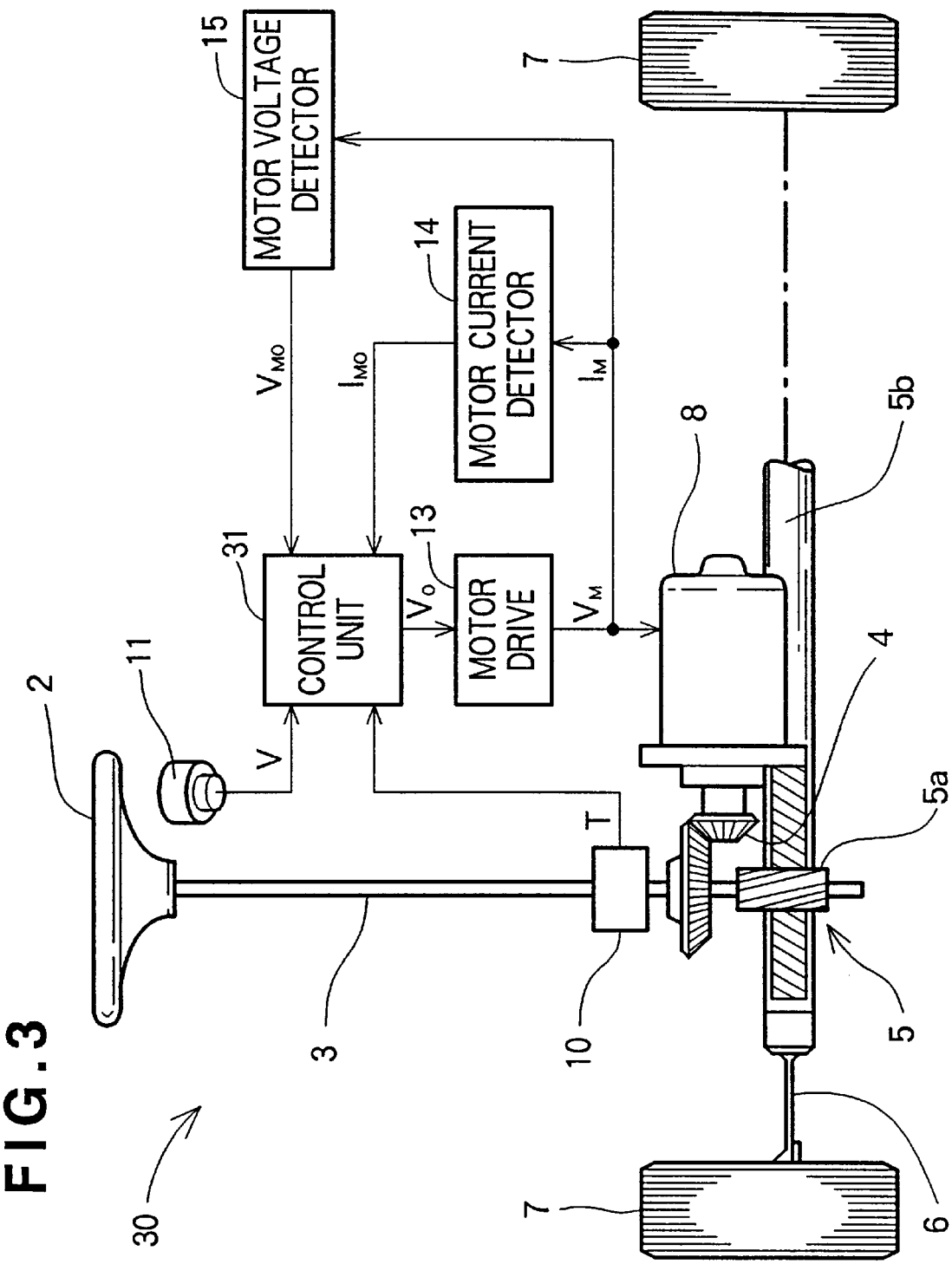
FIG. 3 is a block diagram showing a general setup of an electric power steering apparatus according to a second embodiment of the present invention.

FIG. 3 is a block diagram showing a general structure of an electric power steering apparatus 30 according to a second embodiment of the present invention, which is arranged to detect a rack-end state of the steering system on the basis of a detected motor current value and thus determines an actual winding resistance value of the electric assisting motor when the rotating speed of the motor is zero. The second embodiment is different from the first embodiment mainly in that it is not provided with the steering angle sensor 16, functioning as the motor condition detector, of FIG. 1 and includes a control unit 31 in place of the control unit 12.

The control unit 31, which basically comprises a microprocessor, an arithmetic operation section, a processing section and a memory, generates a target motor current signal corresponding at least to a steering torque signal T from the steering torque sensor 10 and then generates a motor control signal $V_O$ corresponding to the target motor current signal. The control unit 31 passes the thus-generated motor control signal $V_O$ to the motor drive 13, which in turn drives the electric assisting motor 8 with a motor voltage $V_M$ using the known PWM (Pulse Width Modulation) technique.

The control unit 31 in the second embodiment detects a rack-end state by ascertaining when a motor current signal $I_{MO}$ from the motor current detector 14 exceeds a maximum value of a target motor current, and determines an actual winding resistance value $R_M$ of the assisting motor 8 being employed in the apparatus, on the basis of a motor voltage signal $V_{MO}$ and motor current signal $I_{MO}$ that are generated by the motor voltage detector 15 and the motor current detector 14 in the rack-end state.

Figure 4:
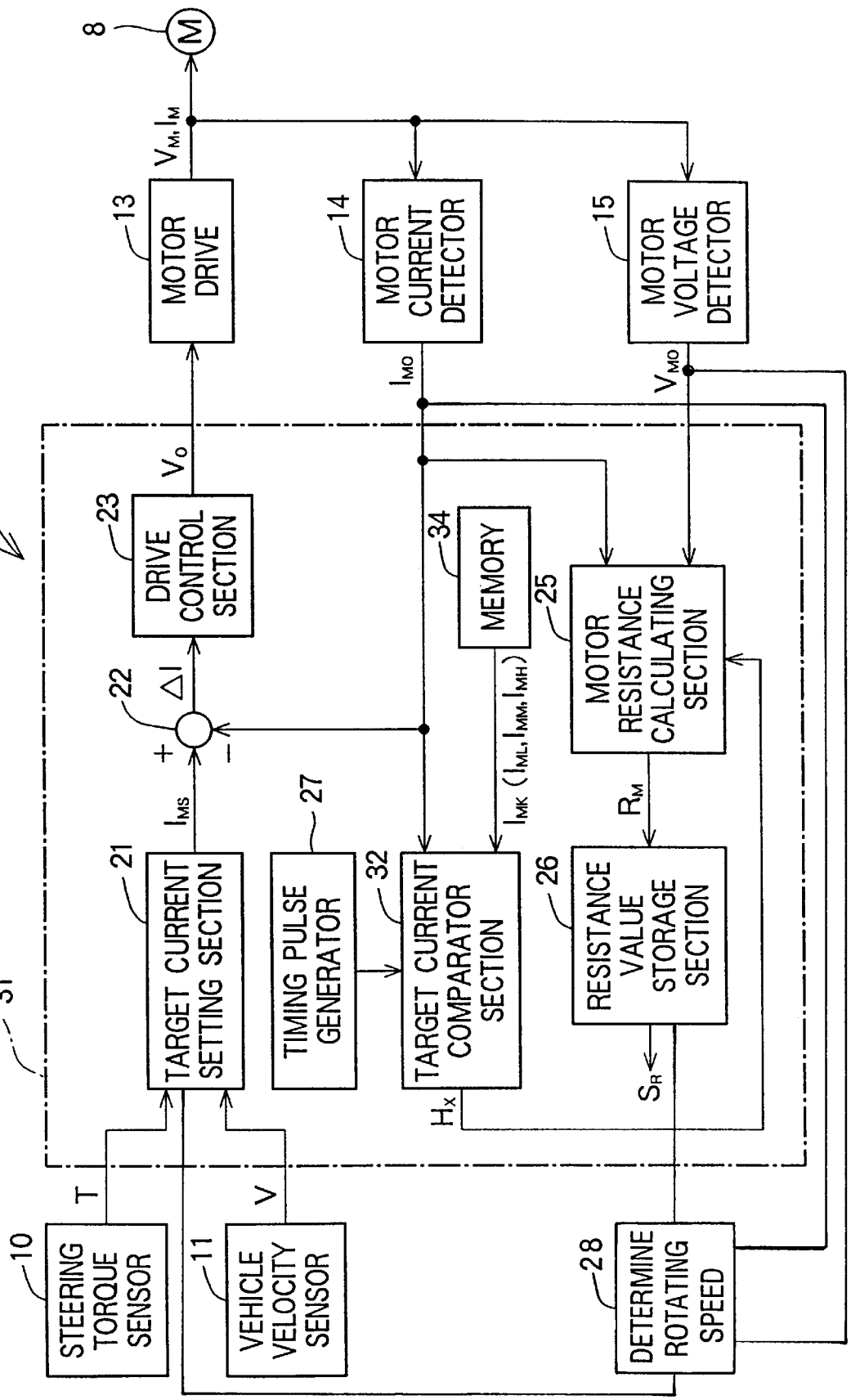
FIG. 4 is a block diagram showing principal electrical components of the electric power steering apparatus of FIG. 3.

FIG. 4 is a block diagram showing principal electrical components of the electric power steering apparatus 30 of FIG. 3, among which are the steering torque sensor 10, vehicle velocity sensor 11, control unit 31, motor drive 13, motor current detector 14 and motor voltage detector 15. The control unit 31 further includes a target motor current setting section 21, an offset calculating section 22, a drive control section 23, a target current comparator section 32, a motor resistance calculating section 25 and a resistance value storage section 26.

The target motor current setting section 21 includes a memory, such as a ROM, which has prestored therein various values of target motor current $I_M$, acquired through experiments, arithmetic operations or the like, corresponding to possible values of steering torque signal T. Upon receipt of a steering torque signal T from the steering torque sensor 10, the target motor current setting section 21 reads out one of the values of target motor current $I_M$ corresponding to the value of the received steering torque signal T and passes the read-out value of target motor current $I_M$ to the offset calculating section 22.

Figure 6:
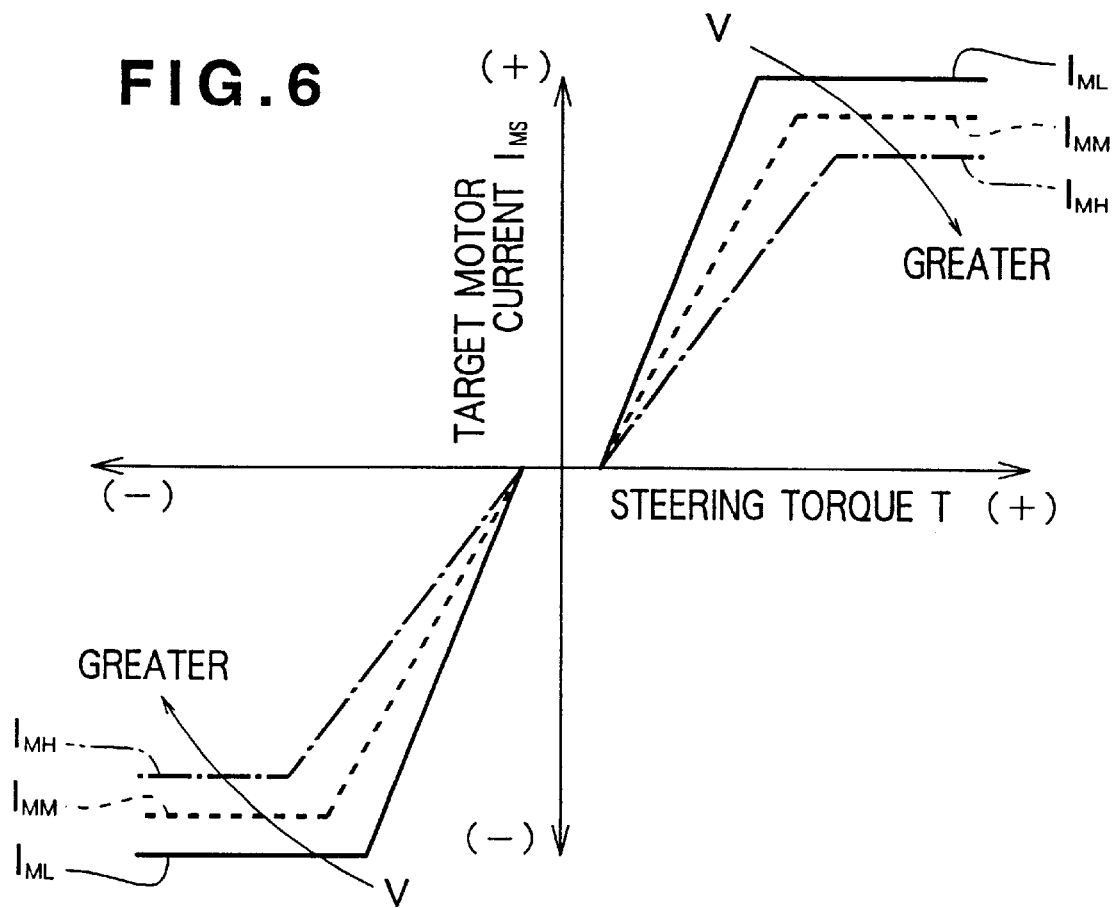
FIG. 6 is a graph showing an exemplary characteristic curve of target motor current versus steering torque in the second embodiment.

FIG. 6 is a graph showing an exemplary characteristic curve of target motor current $I_M$ versus steering torque T in the second embodiment. As seen in FIG. 6, the target motor current $I_M$ increases as the steering torque T becomes greater and presents a saturated or maximum value after the steering torque T exceeds a predetermined value. The target motor current $I_M$ also presents a characteristic of decreasing as the vehicle velocity V becomes greater, even when the steering torque T remains at a same value. In this example, the target motor current $I_M$ is set to present three different maximum values for three vehicle velocity ranges: maximum target motor current value $I_{ML}$ in a low velocity-velocity range; maximum target motor current value $I_{MM}$ in a medium velocity-velocity range; and maximum target motor current value $I_{MH}$ in a high velocity-velocity range.

In FIG. 4, the offset calculating section 22, which includes a subtracter or software-controlled subtraction function, computes a difference or offset between the values of the target motor current signal $I_{MS}$ from the target motor current setting section 21 and the motor current signal $I_{MO}$ from the motor current detector 14 and then supplies the drive control section 23 with an offset signal $\Delta I$ indicative of the computed offset. The drive control section 23, which includes a PID control and a control signal generator, performs PID (Proportional, Integral and Differential) operations on the offset signal $\Delta I$ from the offset calculating section 22, generates a motor control signal $V_O$ comprised of an ON signal and PWM control signal having a predetermined duty cycle, and feeds the motor control signal $V_O$ to the motor drive 13.

Each time a timing pulse is received from the timing pulse generator 27, the target current comparator section 32, which includes a comparator or software-controlled comparison function, makes a comparison between the value of the motor current signal $I_{MO}$ supplied from the current detector 14 and the maximum target motor current value $I_{MK}$ ($I_{ML}$, $I_{MM}$ or $I_{MH}$), corresponding to the current value of the vehicle velocity signal V, prestored in a memory 34. If the value of the motor current signal $I_{MO}$ is greater than the maximum target motor current value $I_{MK}$ ($I_{MO}>I_{MK}$), the comparator section 32 outputs a first-level (e.g., high-level) comparison result signal $H_X$ to the motor resistance calculating section 25.

Normally, the value of the motor current signal $I_{MO}$ would not exceed the maximum target motor current value $I_{MK}$ because the motor current $I_M$ is always controlled by the control unit 31 to follow the target motor current; however, the instant the rack is brought to an end by the driver's manual steering operation, the rotating speed of the motor 8 suddenly drops to zero and thus the motor current signal $I_{MO}$ would momentarily exceed the maximum target motor current value $I_{MK}$. Therefore, it is possible to detect a zero-rotating-speed condition of the assisting motor 8 on the basis of detection of the varying motor current.

If, on the other hand, the value of the motor current signal $I_{MO}$ is not greater than the maximum target motor current value $I_{MK}$ ($I_{MO} \leq I_{MK}$), the comparator section 32 outputs a second-level (e.g., low-level) comparison result signal $H_X$ to the motor resistance calculating section 25.

Upon receipt of the high-level comparison result signal $H_X$ from the comparator 32, the motor resistance calculating section 25, which has a division function, divides the current value of the motor voltage signal $V_{MO}$ supplied from the motor voltage detector 15 by the current value of the motor current signal $I_{MO}$ supplied from the motor current detector 14 to thereby determine a winding resistance value $R_M$ of the assisting motor 8 ($R_M=V_{MO}/I_{MO}$). The thus-determined resistance value $R_M$ will be stored into the resistance value storage section 26.

Thus, when the value of the motor current signal $I_{MO}$ is greater than the maximum target motor current value $I_{MK}$ ($I_{MO}>I_{MK}$), the winding resistance value $R_M$ of the motor 8 may be computed using Equation (2) above by treating the motor rotating speed $M_V$ as zero ($M_V=0$.) The motor current $I_M$ under this condition would be greater than the current caused to flow through the motor 8 in response to the normal steering operation.

The resistance value storage section 26 comprises a rewritable memory, such as an EEPROM, which retains the winding resistance value $R_M$ until a new winding resistance value $R_M$ is received from the motor resistance calculating section 25 and outputs the stored value $R_M$ as a winding resistance value signal $S_R$ when necessary.

Because the stored content in the resistance value storage section 26 represents an actual winding resistance value $R_M$ of the electric assisting motor 8 being employed in the apparatus as indicated at numeral 28, the motor rotating speed $M_V$ can be determined with high accuracy on the basis of the motor current $I_M$ and motor voltage $V_M$ in any steering conditions, by just applying the stored winding resistance value $R_M$ to Equation (1) above. The motor rotating speed $M_V$ thus determined with high accuracy can be used to provide good steering control. In a preferred implementation, the determination of the winding resistance value $R_M$ is carried out prior to shipment of the automotive vehicle from a factory or during maintenance or inspection at a service station, by purposely creating a rack-end state. The winding resistance value $R_M$ may also be determined by the vehicle driver effecting a steering operation without driving.

In summary, the second embodiment has been described above is characterized in that the control unit 31 includes the target current comparator section 32 for making a comparison between the value of the motor current signal $I_{MO}$ and the maximum target motor current value $I_{MK}$ set by the target motor current setting section 21 and the motor resistance calculating section 25 for calculating a winding resistance value $R_M$ of the assisting motor 8 on the basis of the motor voltage $V_M$ and motor current $I_M$ when the value of the motor current $I_{MO}$ has become greater than the maximum target motor current value $I_{MK}$. With this arrangement, it is possible to determine an actual winding resistance value $R_M$ of the electric assisting motor 8 being employed in the apparatus, by detecting a point when the motor current $I_{MO}$ has exceeded the maximum target motor current value $I_{MK}$ and treating the detected point as a zero-rotating-speed condition of the assisting motor 8.

Obviously, various minor changes and modifications of the present invention are possible in the light of the above teaching. It is therefore to be understood that within the scope of the appended claims the present invention may be practiced otherwise than as specifically described.

What is claimed is:

1. An electric power steering apparatus for an automotive vehicle which includes an electric motor for applying an electric steering assist to a steering system interconnecting a steering wheel and steered wheels of the automotive vehicle, a steering torque sensor for detecting steering torque applied to the steering system, a motor voltage detector for detecting a motor voltage supplied to said electric motor, a motor current detector for detecting a motor current flowing through said electric motor, a motor condition detector for detecting a zero-rotating-speed condition of said electric motor, a control unit including a current setting section for setting a target motor current corresponding at least to the steering torque detected by said steering torque sensor and, a motor drive for driving said electric motor on the basis of a motor control signal generated by said control unit, the improvement comprising:

said control unit further including a drive control section generation the motor control signal on the basis of an offset between the target motor current and the motor current detected by said motor current detector, a motor resistance calculating section for, on the basis of the motor voltage and motor current, calculation a winding resistance value of said electric motor when said motor condition detector is detecting the zero-rotating-speed condition of said electric motor, and a resistance value storage section for retaining the winding resistance value, wherein rotating speed of the motor is determined based on signals from said motor voltage detector, said motor current detector, and said resistance value storage section to permit said control unit to provide unload control for said electric motor.

2. An electric power steering apparatus as recited in claim 1 wherein said motor condition detector comprises a steering angle sensor and wherein said control unit further includes a comparator section for making a comparison between a steering angle detected by said steering angle sensor and a reference steering angle corresponding to the zero-rotating-speed condition of said electric motor.

3. An electric power steering apparatus as recited in claim 2 wherein when a result of the comparison by said comparator section indicates that the steering angle detected by said steering angle sensor is greater than the reference steering angle, said motor resistance calculating section executes a division of the motor voltage detected by said motor voltage detector by the motor current detected by said motor current detector, to thereby calculate the winding resistance value.

4. An electric power steering apparatus as recited in claim 3 wherein when the motor current detected by said motor current detector is below a predetermined value, said motor resistance calculating section does not execute the division.

5. An electric power steering apparatus for an automotive vehicle which includes an electric motor for applying an electric steering assist to a steering system interconnecting a steering wheel and steered wheels of the automotive vehicle, a steering torque sensor for detecting steering torque applied to the steering system, a motor voltage detector for detecting a motor voltage supplied to said electric motor, a motor current detector for detecting a motor current flowing through said electric motor, a motor condition detector for detecting a zero-rotating-speed condition of said electric motor, a control unit including a current setting section for setting a target motor current corresponding at least to the steering torque detected by said steering torque sensor and, a motor drive for driving said electric motor on the basis of a motor control signal generated by said control unit, the improvement comprising:

said control unit further including a drive control section for generating the motor control signal on the basis of an offset between the target motor current and the motor current detected by said motor current detector, a comparator section for making a comparison between the motor current detected by said motor current detector and a maximum target motor current based on vehicle velocity, a motor resistance calculating section for, on the basis of the motor voltage and the motor current, calculating a winding resistance value of said electric motor when the motor current detected by said motor current detector has become greater then the maximum target motor current, and a resistance value storage section for retaining the winding resistance value, wherein rotating speed of the motor is determined based on signals from said motor voltage detector, said motor current detector, and said resistance value storage section, said control unit decreasing the target motor current when the rotating speed calculated by the rotating speed calculating section is under a predetermined value, said control unit thereby providing unload control of said electric motor.

* * * * *